Dec. 25, 1962   K. H. JOHNSTON   3,070,241
MACHINE FOR UNSTACKING PALLETIZED LOADS
Filed Aug. 24, 1959   4 Sheets-Sheet 1
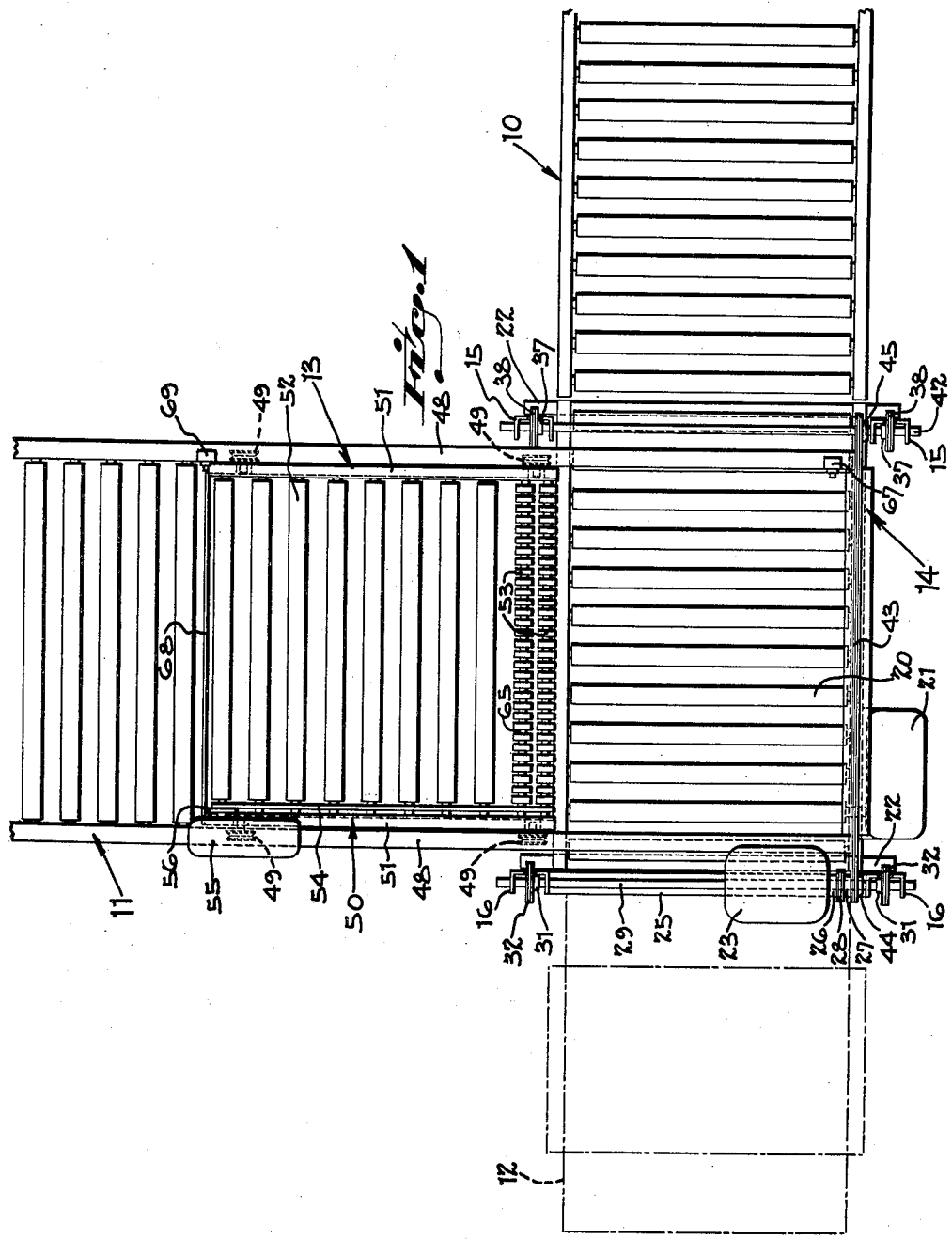
INVENTOR.
Kenneth H. Johnston,
BY
Wood, Herron & Evans.
ATTORNEYS.

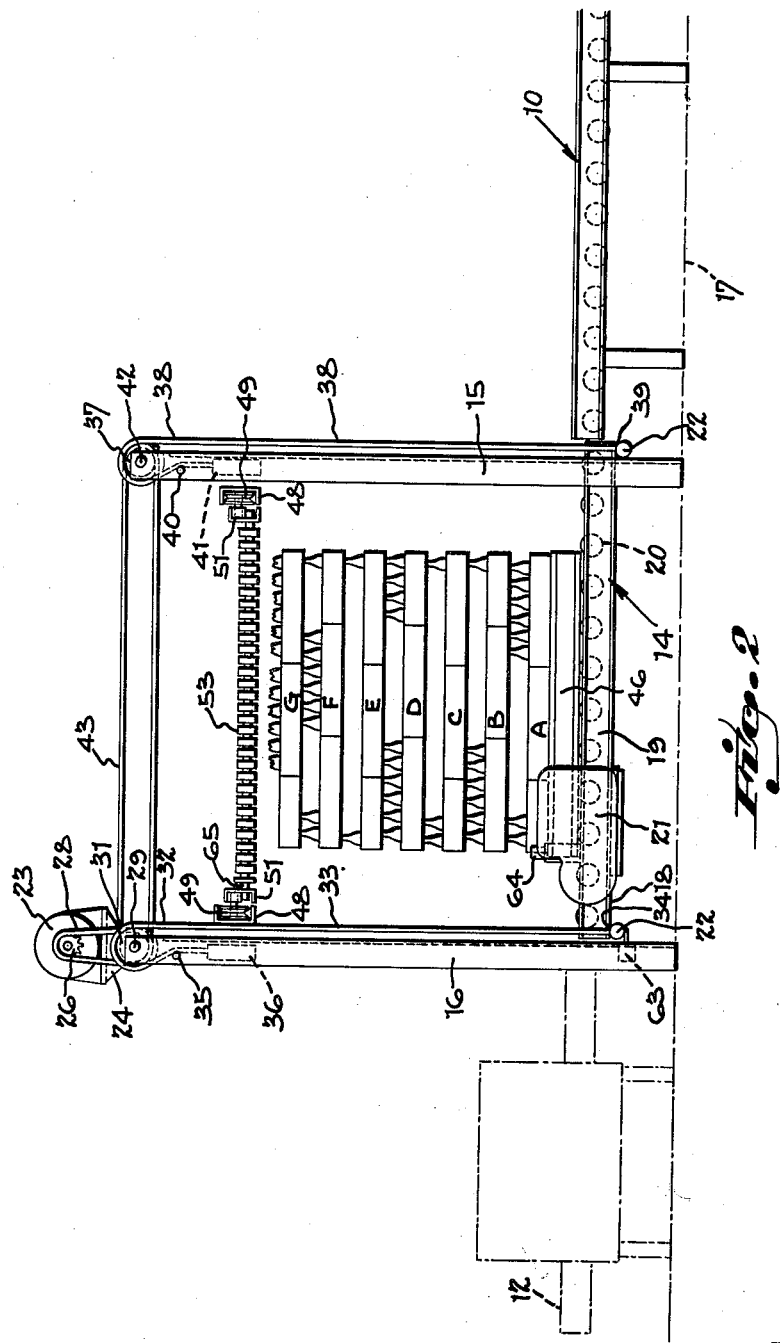

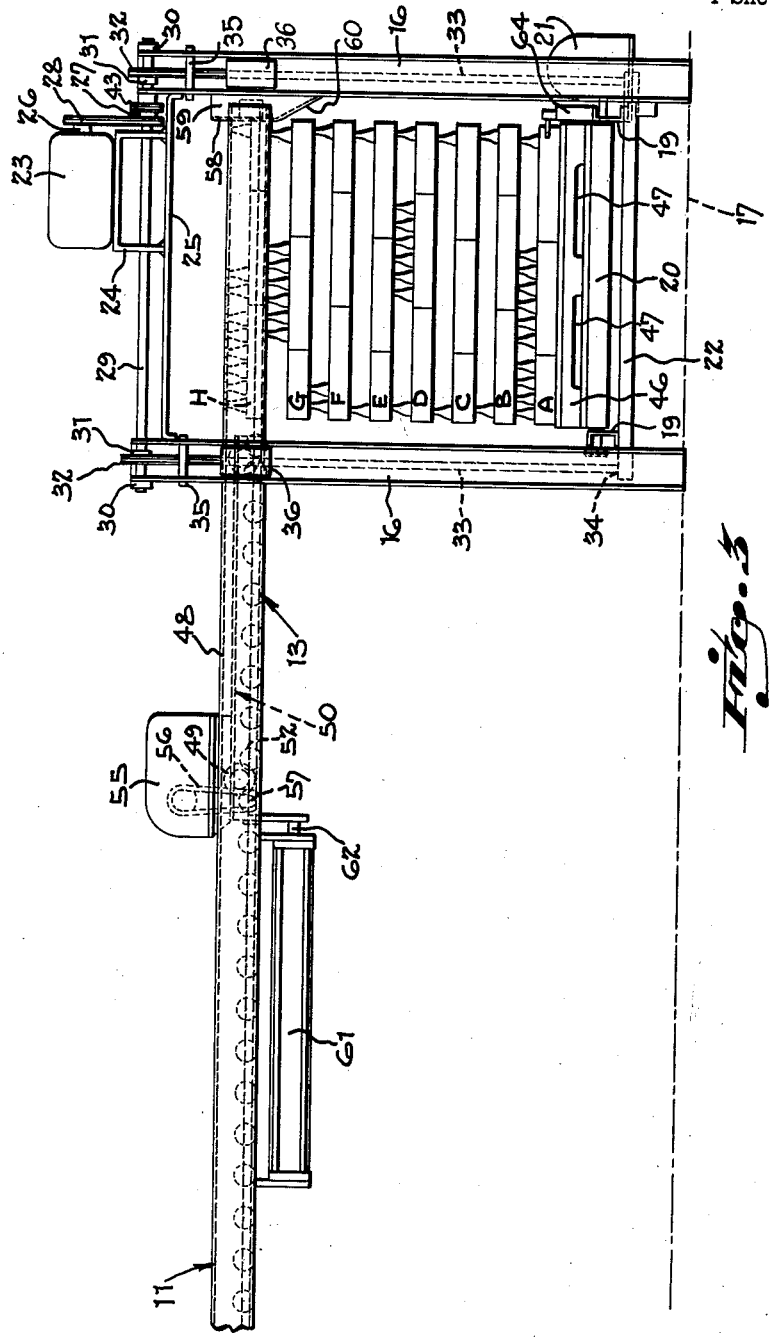

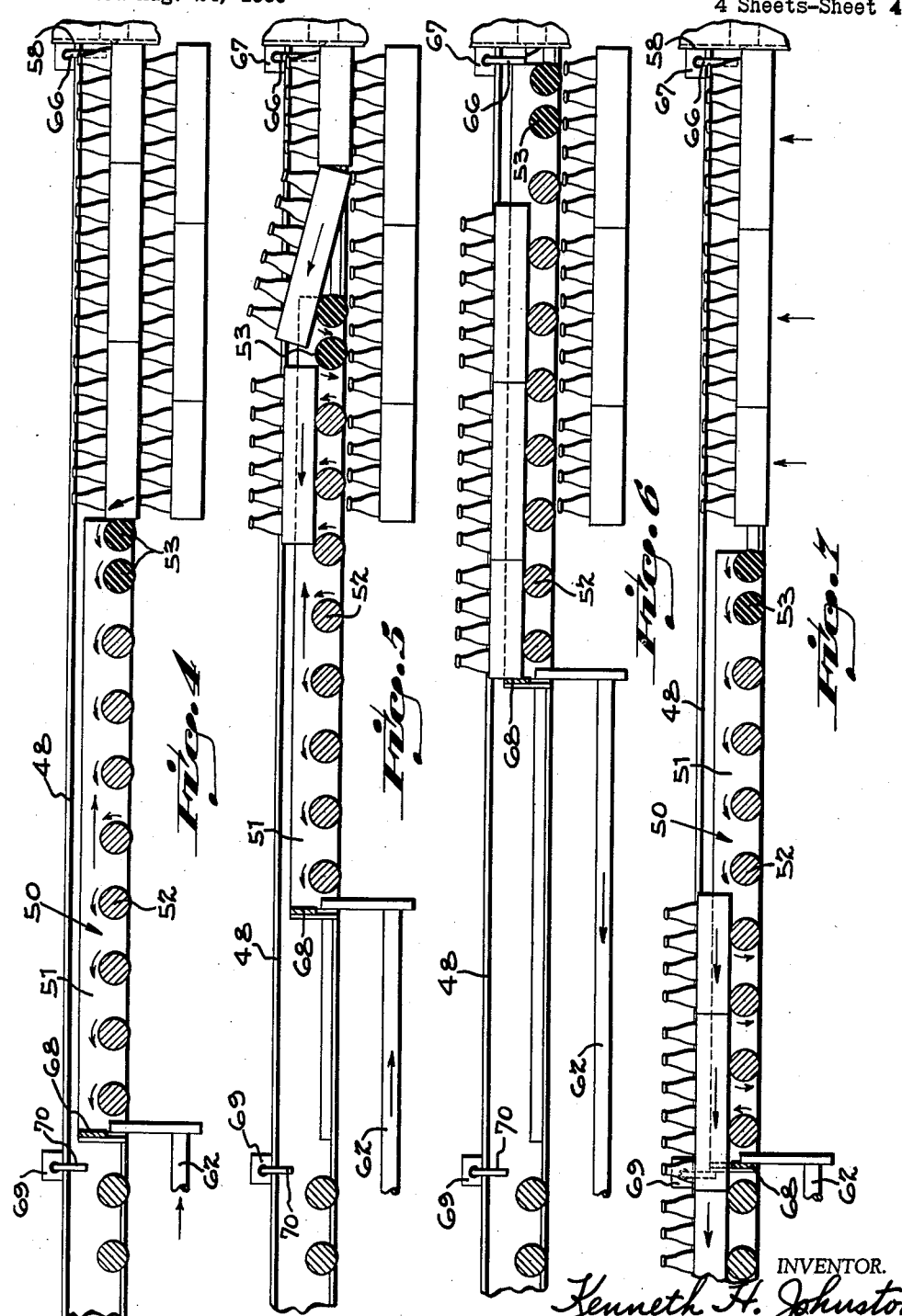

United States Patent Office 3,070,241
Patented Dec. 25, 1962

3,070,241
MACHINE FOR UNSTACKING PALLETIZED
LOADS
Kenneth H. Johnston, Cleves, Ohio, assignor to Alvey
Conveyor Manufacturing Company, St. Louis, Mo., a
corporation of Missouri
Filed Aug. 24, 1959, Ser. No. 835,583
3 Claims. (Cl. 214—8.5)

This invention relates to article handling apparatus and it is directed in particular to an improved machine, of the type designated a "depalletizer," which is adapted to undo the stacked condition of boxes, cases, cartons etc. in which these articles are arranged for storage and for transportation upon a pallet, a pallet being a simple rectangular platform, usually made of wood, which is adapted to be moved about by means of a fork-lift truck.

This disclosure is explained in relation to the unstacking of the cases which are used in bottling plants, because the depalletizers of the past were designed primarily for such use. Bottling plants use two types of cases, one being a full-depth case, in which the bottles are completely enclosed, and the other being a half-depth case, in which the upper halves of the bottles are exposed. In the past, two, entirely different types of depalletizer machines have been required to handle these two types of cases.

The primary objective of the present invention has been to provide a machine capable of handling both types of cases; and as will be apparent, to provide a machine which is capable of handling many other types of articles in addition to bottle cases, including non-rigid articles such as sacks of heavy materials, for example cement, which could not be handled by the depalletizers of the past.

In a typical, large bottling plant operation, incoming cases of empty bottles are unloaded from the delivery trucks and stacked upon pallets. The cases are then transported by a fork-lift truck to a storage area where they remain in stacked condition upon the pallets until needed. When needed, the cases are transported to the depalletizer which removes one layer of cases from a stack at a time and deposits them on an unscrambler table or on a conveyor leading to an unscrambler table, the purpose of the unscrambler table being to align the cases end to end for delivery by a conveyor to an unloading machine which removes the bottles from the cases. At the depalletizer, provision is made to remove and stack or otherwise take care of the empty pallets.

There are several ways of arranging the cases within a stack upon a pallet. In one, the cases in the lowermost layer are arranged side by side in two or more rows. All cases in the next layer and the next, so on to the top of the stack, are arranged in this same order. Thus, the completed stack consists of a number of columns of cases, each column consisting of cases which are stacked directly one on top of the other. Such a stack may be eight or more cases high and it must be handled carefully while it is being moved, because in this arrangement of the cases within the stack, there is nothing to tie the individual columns together.

From the viewpoint of handling and moving palletized loads, another stacking method, providing an interlocked stack, is preferred. In a stack of this sort the cases in any one layer are turned through 90 degrees with respect to the cases in the layers above and below it. The interlocking pattern thus provided prevents toppling of the cases while they are being moved from place to place by a fork-lift truck, and the interlocking method is preferred over the column method of stacking for this reason. However, the column method had to be used in many instances in the past, because it provided the only kind of stack which could be accommodated by the available depalletizer machines. The present invention provides a depalletizer which works equally well with either type of stacking system, because it does not require that the cases within a stack be arranged in any precise order, other than that they be arranged in layers. The cases may, if desired, be arranged haphazardly within each layer, even to the extent that there are voids within the layers. Such voids could not be tolerated by the depalletizers of the past.

The palletizer machines of the past designed for full-depth cases removed a layer at a time from the bottom of the stack. The other machines, designed for use with half-depth cases, removed a layer at a time from the top of the stack. The full-depth depalletizer employed large grippers which moved in from both sides of the stack to press against the cases. As a first step in a depalletizing operation for full-depth cases the entire stack was raised and the pallet removed from beneath it. The entire stack was then lowered and released by the grippers. The grippers then moved up to the layer of cases second from the bottom and the stack again lifted so that the lowermost layer was free to be removed from underneath it. This procedure was repeated, working up the stack, going from layer to layer to the top. This method of unstacking has the disadvantage that there was nothing to support the bottom of the stack between the grippers and consequently, a considerable amount of pressure had to be exerted on the sides of the cases to prevent the individual cases in this layer from slipping out. Obviously, there could be no voids in any of the layers of the stack.

For the most part, full-depth cases were stacked in columns. However, in some instances the cases were of such a size that an interlocking pattern could be used and still be accommodated by the available machines. This method of unstacking from the bottom up worked fairly well, providing the cases are full-depth cases and providing not too great a load is placed on the lowermost layer in the stack. It could not be used for half-depth cases, because the short walls of half-depth cases do not provide the required bridging effect across a layer of cases from gripper to gripper.

For half-depth cases the machine which have been provided utilized tines, these tines moving under a layer of cases between the necks of the bottles in the cases immediately below it. This operation, of course, required that the bottles, and thus the cases, be precisely aligned across the stack. Furthermore, this type of operation had a very serious limitation, because the last or bottom layer of the stack could not be lifted with the tines and had to be removed from the pallet by hand.

It may be appreciated, therefore, that the two approaches in the past to the problem of undoing a stack of cases have not considered the possibility of a mechanism capable of entering the juncture between two layers within a stack of full-depth cases or in the instance of half-depth cases, the possibility of entering the juncture between the lowermost layer and the pallet. The machine of this invention works upon this principle, and it includes an apparatus, designated a "stripper," which moves into the stack from the side, engaging the stack, and moving across it underneath the cases in the uppermost layer to strip the cases in this layer from the stack. This operation is carried out by unstacking from top to bottom with the stack resting directly upon the pallet and, as will be seen, substantially any type of stacked containers, including bags etc. may be depalletized by the machine without making any changes in it other than minor adjustments. Hence, in a bottling plant, the one depalletizer may be employed to unload both full-depth cases and half-depth cases from column stacked or interlocking stacked pallet loads without change, and the same machine is also adapted for use in other article handling operations, even including operations in which the articles to be handled are not regular in outline, without substantial changes being made.

Other objectives and advantages of the machine of the invention will be readily apparent to those skilled in the art from the following detailed description of the drawings in which:

FIGURE 1 is a top plan view of a depalletizer machine incorporating the principles of the present invention.

FIGURE 2 is a front elevational view thereof.

FIGURE 3 is a side elevational view thereof.

FIGURES 4 through 7 are semi-diagrammatic views illustrating, step by step, the manner in which layers of half-depth cases are unstacked.

It is preferred that the depalletizer be utilized in conjunction with a roller conveyor, such as the one designated 10, which delivers palletized stacks to the machine, and a conveyor, such as the one designated 11, which delivers the cases, after they have been unstacked, to a machine such as an unscrambler table. In the operation disclosed, it is also preferred that some means be provided for taking care of the empty pallets after the cases have been unloaded from them. Any suitable apparatus may be employed and positioned as shown at 12 by dot-dash lines. The conveyor 10 may be powered if desired, or it may be slanted so that the loaded pallets roll toward the machine by gravity. The conveyor 11 may also be powered or it may be slanted to convey the cases by gravity away from the machine.

There are two main elements of the machine, one being a stripper assembly, designated generally 13, and the other being an elevator assembly, designated generally 14. The elevator will be described first. This part of the machine comprises four corner posts. Two of these posts, indicated at 15—15, are located at the two sides of the end of conveyor 10. The other two corner posts are designated 16—16 and they are spaced from the first set of corner posts by an amount to accommodate the longest pallet utilized. The type of corner post is not critical, although it is found that channels such as those shown in the drawings work well. These channels may be secured to a base member (not shown) or they may be embedded in concrete at floor level, which level is indicated by the dot-dash line 17.

The floor of the elevator comprises a power driven conveyor section 18 which may be of conventional construction including side rails 19—19, a plurality of driven rollers 20, and an electric motor and speed reduction unit 21 by means of which the rollers are powered. Each end of the elevator floor has a cross bar 22 welded to its underside and, as will be seen in FIGURES 1 and 3, these cross bars project beyond the side rails 19—19 of the conveyor section forming the elevator floor.

Another electric motor and speed reduction unit is shown at 23. This unit is mounted at the top of the elevator upon a base 24 welded or otherwise affixed to a bracket 25 which extends between and is welded to the two corner posts 16—16. A sprocket 26 is keyed to the drive shaft of the motor and speed reduction unit 23 and this sprocket is in driving connection with another sprocket 27, which is directly beneath it, by means of a chain 28. Sprocket 27 is keyed to a cross shaft 29 which is journalled in the walls of the two channels forming corner posts 16—16. As shown in FIGURE 3, the opposite ends of shaft 29 may be journalled in holes provided in the side walls of each of the channels and following customary practice anti-friction bearings (not shown) may be used at these holes. The shaft 29 is prevented from shifting longitudinally by means of collars 30—30 which are secured to its opposite ends at the outer sides of the corner posts. Each end of shaft 29 mounts a sprocket wheel 31. The webs of the channels forming the corner posts are cut out to accommodate these sprocket wheels, the wheels being larger in diameter than the depths of the channels. A chain 32 is engaged over the top of each sprocket 31. One run 33 of this chain extends down along the outside of the channel member as shown in FIGURE 2 and its lower end 34 is secured to an end of the cross rod 22 which is welded to the underside of the elevator floor. The other end of the chain passes down into the channel around a guide pin 35 and it has a weight 36 affixed to it, the weight being constrained to ride inside of the channel by means of pin 35. The other side of the elevator also has two sprocket wheels designated 37—37 respectively which correspond to sprocket wheels 31—31 mounted in like fashion in the upper ends of the two corner posts 15—15. Chains 38—38 are engaged over two sprocket wheels 37—37. As previously described, one end of each one of these chains is affixed as at 39 to an end of the cross bar 22. The opposite ends pass around guide pins 40—40 and each has a weight 41 affixed to it to ride within the channel. The two sprocket wheels 37—37 are keyed to a cross shaft 42 which is similar to the cross shaft 29. The two shafts are connected so that they rotate together by means of a chain 43 which is engaged over a sprocket 44 on shaft 29 and a sprocket 45 on shaft 42. It may be seen, therefore, that when the motor is driven in one direction, the two sets of chains which are attached to the elevator are either raised or lowered depending upon the direction of rotation of the motor and speed reduction unit 23, the motor of unit 23 being a reversing type. This motor is also controlled by means of switches to which reference is made later so that it raises the elevator from the position shown in FIGURE 2 stepwise, the raising movement in each instance being equal to the height of the individual cases of the palletized load to be unstacked. As will be seen, one of the few changes in the machine necessary to adapt it for operation of different types of stacked articles is to adjust the amount that the elevator is raised during each one of its stepwise movements.

As disclosed, the machine is arranged to unstack a load which is eight layers of cases high, see FIGURE 3. The cases shown are half-depth cases so that the upper halves of the bottles are exposed. Also as shown, the cases are stacked in an interlocking pattern. In this stack a pallet is shown on the bottom at 46. Following conventional practices this pallet may be made of wood with slots such as those shown at 47—47 being provided for the reception of the tines of a lift-fork truck. The layers of cases on pallet 46 are designated A through H going from the bottom to the top. As shown, the stripper 13 is disposed at the level of the layer of cases H which is the top layer of the stack, and it includes side rails 48—48 which are channel-shaped or U-shaped in cross section with the open sides of the channels facing inwardly toward one another such that they may mount tracks for four wheels, each one of which is designated 49, mounted at the four corners of a rectangular carriage 50. The frame of the carriage comprises two side rails 51—51 each one of which is formed from a channel, the open sides of which face outwardly. Appropriate cross bracing may be provided to interconnect the two side rails 51—51. As shown, eight conventional conveyor rollers 52 are journalled between the two side rails 51—51 and it is preferred that all of these rollers be driven in the direction shown by the arrows in FIGURES 4-7. The forward end of the stripper adjacent to the elevator has two driven stripper or friction rollers 53—53 which are also journalled between the two side rails 51—51 in alignment with the rollers 52. All rollers of the stripper rotate at the same speeed and in the same direction, being connected by means of a chain 54 which engages sprockets on the rollers at the left side of the stripper as shown in FIGURE 1. Inasmuch as a drive of this type is conventional, the interconnection of the chain to each of the sprockets on the rollers is not shown in detail. Power for the rollers of the stripper is provided by an electric motor and speed reduction unit 55 which is mounted directly upon the stripper to move with it. As shown in FIGURE 1, the motor and gear reduction unit is located to one side of the stripper and at the end thereof away from the elevator. Following conventional practices the motor and speed reduction unit drives a sprocket around which a chain 56 is engaged. This chain is linked to the chain 54 by means of a second sprocket 57 and appropriate gearing not shown in detail. It may be seen, therefore, that all of the rollers of the stripper are "live rollers" and as will be explained, it is preferred that these rollers operate continuously.

The two channels or tracks 48—48 in which the carriage 50 rides extend into the elevator as shown in FIGURE 3 at the level of the uppermost layer of the stack, terminating at an abutment plate 58 which is secured to the two corner posts 15 and 16 of the elevator which are at the front of the machine. This abutment plate is secured to the inner sides of these two corner posts by means such as a mount bracket 59. As shown, the abutment plate slants downwardly below the two channels 48—48 to provide a wedge surface 60, the purpose of which is to shift any misaligned layers of cases so that the sides of these cases do not catch under the abutment plate during the raising of the elevator. The stripper is driven by means of a hydraulically or pneumatically operated cylinder 61. This cylinder includes a conventional piston rod 62 and the outer end of the piston rod is attached to the carriage 50 by means of a simple bracket as shown. Inasmuch as the piston and cylinder assembly is of conventional construction it is not believed necessary to disclose it in detail here, other than to state that its stroke must carry the forward end of the stripper from the position shown in FIGURE 3, where it is just to the rear of cases upon the elevator, forward to a point where it just clears abutment plate 58.

*Operation*

Palletized loads of cases approach the elevator of the machine on conveyor 10. As explained, the rollers of conveyor 10 may be driven or operated by gravity. If driven, provision must be made to stop the rollers to prevent other palletized loads from being fed onto or against the elevator when it is in operation. If gravity is relied upon some sort of a brake or stop must be provided at the end of the conveyor adjacent the elevator. The starting position for the elevator is set by means of a limit switch 63. This switch is wired into the control circuit for the motor 23 which operates the elevator. The switch is positioned to be contacted by the cross bar 22 at a time when the driven rollers of the elevator are aligned with the rollers of conveyor 10. Such contact de-commissions motor 23. The motor 21 which drives the rollers 20 of the elevator floor may also be started through means such as a relay controlled by switch 63. Alternatively, motor 21 may be started by a manually operated switch and also de-commissioned in the same manner. For accuracy, however, it is preferred that the motor 21 be de-commissioned by a switch 64 which is mounted upon a side rail 19 of the elevator floor in a position to make contact with a case in the lowermost layer of the stack. Such contact de-commissions motor 21 when the stack is centered upon the elevator. It will be noted that the switch arm of switch 64 is above the pallet 46, for reasons which will be explained. See FIGURE 3. Switch 64 may also be wired into a circuit for controlling the flow of air or of hydraulic fluid, whichever is used, to cylinder 61. In this way, as soon as the stack of cases is centered upon the elevator, the cylinder starts to feed the stripper carriage toward the front of the machine. Preferably, the motor 55 which drives the rollers of the stripper carriage operates continuously.

The two stripper rollers 53—53 which are at the front of carriage 50 are constructed much like the squeeze rollers of washing machines through which clothes are fed to remove excess water. Each roller comprises a shaft 65 to which a cylinder of rubber is vulcanized. However, instead of being a continuous cylinder the roller preferably is broken into a plurality of short sections as shown. This may be done in one of two ways during the manufacture of the roller. Either the roller may be made as a continuous cylinder and then sections cut out, or the roller may be made initially in the short sections shown, each section being vulcanized in place. It is found to be expedient to employ soft rubber, at least for the surfaces of all of the roller sections. These surfaces also may be roughened if desired.

The stripper carriage advances to present the front stripper roller to the sides of the cases in the uppermost layer of the stack. The point of contact of the front roller with the top layer is shown in FIGURE 4. It will be noted that the front stripper roller and all of the rollers are driven in a direction which causes the cases of the layer with which contact is made to be raised. As may be seen in FIGURE 4 the cases in the top layer are backed up by engagement with the abutment plate 58 so that the upper layer of cases cannot shift toward the front of the machine when the front stripper roller contacts those cases which are at the rear of the upper layer. The carriage continues its forward movement and in doing so the cases are lifted onto the live rollers and they start to feed toward the rear of the carriage. It is preferred that the rollers be driven slightly faster than the forward lineal speed of the carriage so that cases on top of the live rollers of the carriage do not interfere with cases being picked up by the front stripper roller. The stripper carriage continues forward, picking up cases as it goes until it moves into a position adjacent to the forward end of the machine where it comes into contact with the switch arm 66 of a switch 67. This switch is mounted upon the forward end of the side rail 48 which is at the right side of the machine as viewed in FIGURE 1. This is a reversing switch and it is wired into the circuit which controls the pneumatic or hydraulic circuit of cylinder 61. It causes the piston within cylinder 61 to retract, which pulls the stripper carriage toward the rear of the machine. Since the rollers 52 of the stripper carriage are ordinary conveyor rollers, made of metal, the cases stop their rearward movement upon the carriage when contact is made with a gate 68 at the rear end of the carriage, the rollers 52 simply slipping on the bottom of the cases. Means, not shown, are provided to drop gate 68 when the carriage reaches its fully retracted position, the means being a solenoid by way of example, controlled by a switch 69 having a switch arm 70 in the path of the carriage. When contact is made with switch arm 70, shown in FIGURE 7, gate 68 drops and the live rollers of the stripper carriage move the cases off the carriage onto the conveyor 11 in the rear of the machine. The switch 69 is also wired into the circuit which controls the operation of elevator motor 23 and as soon as switch 69 is tripped, the elevator raises by an amount equal to one layer of the stack. Stepping switches for controlling the elevator motor during the raising movement of the elevator are well known and for this reason it is not believed to be necessary to disclose such a switch.

The operation thus described is repeated until the bottom-most layer has been stripped from the pallet. When this occurs the elevator motor reverses and the elevator with the pallet upon it is dropped down into the position shown in FIGURE 2. At this time the elevator floor motor 21 is started which drives the pallet toward the left onto the receiver which is shown by dot-dash lines 12. The pallet moves underneath the switch arm of switch 64 so that the motor 21 continues to run for feeding another palletized load onto the elevator, the load stopping on the elevator in a center position as previously explained when contact is made with the arm of switch 64.

The control circuitry has not been shown here because it is conventional and because there are actually a great number of ways to provide controls which are known to those skilled in the art. In addition, different types of drives can be utilized for the various parts of the machine other than the ones disclosed. For example, the elevator can be operated hydraulically by means of a ram mounted underneath it. The important consideration is the way in which it functions to raise the cases and to move into the stack. The driven stripper roller at the front of the stripper carriage raises the side of any case with which it comes into contact whether this case by a full-depth or a half-depth one. In addition, it will be appreciated that the shape of the case is unimportant so long as there is a surface to be contacted for lifting the case up onto the roller. It will be appreciated also that the contact does not have to be against a vertical surface such as that provided by the sides of cases. Contact with the side or end of a heavy paper sack is also sufficient to cause the sack to raise up onto the first stripper roller and once it is raised it is fed to the rear of the stripper carriage as illustrated in FIGURES 4 through 7.

Having described my invention, I claim:

1. A machine to unstack a palletized load of articles in which the articles are arranged in layers comprising in combination an elevator adapted to receive said palletized load, means to raise the elevator step by step in increments each one of which is equal to the depth of a layer of stacked articles in the load, a carriage, means mounting the carriage for horizontal reciprocating movement into and out of the elevator at the level of the uppermost layer of articles in said palletized load, a plurality of conveyor rollers mounted in said carriage, at least the front roller of the plurality being resilient and engageable with the sides of articles in the uppermost layer of a stack on the elevator upon movement of the carriage into the elevator, means to drive all of the rollers simultaneously in the direction such that contact with the sides of articles by the front roller causes the articles to be lifted and to be pulled onto the carriage as the carriage moves into the elevator and the last named means driving said rollers such that their surface speeds are greater than the forward lineal speed of the carriage into the elevator so that articles upon the rollers to the rear of the front roller do not interfere with articles being lifted and pulled onto the carriage by the front roller.

2. A machine to undo the stacked condition of articles from loads in which the articles are stacked in layers upon a pallet, said machine adapted to be used in conjunction with a first conveyor for delivering loads to the machine and a second conveyor for delivering articles from the machine, the second conveyor being elevated with respect to the first conveyor by an amount equal to the distance from the bottom of the pallet to the lower part of the uppermost layer of articles in the stack, said machine comprising the combination of an elevator adapted to receive palletized loads from the first conveyor and elevate said loads step by step in increments each one of which is equal to the depth of a layer of the load, a carriage mounted for horizontal reciprocating movement between a position in which it is within said elevator and a position in which it is outside of the elevator to form a continuation of the second conveyor, a plurality of conveyor rollers mounted in said carriage, the roller at the front of said carriage which is adapted to first enter the elevator being a friction roller, means to drive all of said rollers in a direction to deliver articles thereon toward the rear of the carriage, the last named means driving said rollers such that their surface speeds are greater than the lineal speed of the carriage as it moves into said elevator, and a gate at the rear of said carriage, whereby movement of the carriage into the elevator having a load thereon to bring the friction roller into contact with the articles of the uppermost layer causes said articles to be lifted onto the conveyor rollers of the carriage for delivery to the gate, and whereby upon movement of the carriage to the second conveyor and upon the dropping of the gate, the articles are delivered by the carriage to said second conveyor.

3. A machine to undue the stacked condition of articles from loads in which the articles are stacked in layers upon a pallet, said machine adapted to be used in conjunction with a conveyor for delivering articles from the machine, said machine comprising a combination of an elevator adapted to receive palletized loads and elevate said loads step by step in increments each one of which is equal to the depth of a layer of the load, a carriage mounted for horizontal reciprocating movement between a position in which it is within said elevator and a position in which it is outside of said elevator to form a continuation of said conveyor, a plurality of conveyor rollers mounted in said carriage, the roller at the front of said carriage which is adapted to first enter the elevator being a friction roller, means to drive all of said rollers in a direction to deliver articles thereon toward the rear of the carriage, the last named means driving said rollers such that their surface speeds are greater than the lineal speed of the carriage as it moves into said elevator, and a gate at the rear of said carriage, whereby movement of the carriage into the elevator having a load thereon to bring the friction roller into contact with the articles of the uppermost layer causes said articles to be lifted onto the conveyor rollers of the carriage for delivery to said gate, and whereby upon movement of the carriage to the conveyor and upon the dropping of the gate, the articles are delivered by the carriage onto said conveyor.

References Cited in the file of this patent

UNITED STATES PATENTS

| | | |
|---|---|---|
| 1,464,513 | Sutherland | Aug. 14, 1923 |
| 2,338,048 | Minaker | Dec. 28, 1943 |
| 2,659,497 | Verrinder | Nov. 17, 1953 |
| 2,815,870 | Laub | Dec. 10, 1957 |
| 2,931,531 | Brudi | Apr. 5, 1960 |